United States Patent [19]
Heckman

[11] Patent Number: 5,644,088
[45] Date of Patent: Jul. 1, 1997

[54] PORT FORWARD SENSOR FOR LIQUID LEVEL GAUGE OR FLOWMETER

[75] Inventor: Donald B. Heckman, Purcellville, Va.

[73] Assignee: Marsh-McBirney, Inc., Frederick, Md.

[21] Appl. No.: 508,102

[22] Filed: Jul. 27, 1995

[51] Int. Cl.[6] .................................................. G01F 23/18
[52] U.S. Cl. .................. 73/756; 73/301; 73/299; 73/291; 73/292
[58] Field of Search .......................... 73/301, 299, 291, 73/292, 756

[56] References Cited

U.S. PATENT DOCUMENTS 4,549,434   10/1985   Marsh .
5,105,662   4/1992    Marsh et al. .

*Primary Examiner*—George M. Dombroske
*Assistant Examiner*—Joseph L. Felber
*Attorney, Agent, or Firm*—Laubscher & Laubscher

[57] ABSTRACT

An improved flowmeter sensor for measuring the level of liquid flowing in a conduit, pipe or open channel, characterized by an initially air-filled pressure transmitting passage which affords communication between a pressure port contained in the bottom of the sensor body, and a pressure transducer contained in the sensor body. The passage includes a vertical portion communicating at its lower end with the pressure port, and a horizontal portion connected with the transducer, whereby hydraulic pressure forces liquid into the passage to compress the air therein and thereby exert on the pressure transducer a pressure corresponding to the level of liquid in the conduit. The cross-sectional area and high surface energy of the material used to form the passage prevent liquid in the passage from migrating to the pressure transducer.

17 Claims, 2 Drawing Sheets

PORT FORWARD SENSOR FOR LIQUID LEVEL GAUGE OR FLOWMETER

STATEMENT OF THE INVENTION

The present invention relates to an improved flowmeter sensor for measuring the depth of liquid flowing in a conduit, pipe, open channel or the like. The sensor is characterized by the provision of a pressure transducer in the sensor body, and an initially air-filled pressure transmitting passage having both horizontal and vertical sections which transmit to the transducer from a pressure port exposed to the flowing liquid a pressure value which corresponds with the depth or level at which the sensor body is arranged in the liquid. Liquid enters the passage via a pressure port as the liquid level in the conduit rises but does not reach the pressure transducer because of the cross-sectional area of the passage, and the high surface energy material from which the passage is formed. The lower portion of the sensor body also includes a transverse channel containing the pressure port, thereby preventing the pressure port from becoming plugged or fouled by particulate matter associated with the flowing liquid.

BRIEF DESCRIPTION OF THE PRIOR ART

It is known in the patented prior art to measure the depth of a liquid based on the air pressure within a tube which varies with liquid level. The U.S. patent to Norman F. Marsh et al. U.S. Pat. No. 5,105,662, for example, discloses a liquid level measurement system for measuring the level of liquid in a containment vessel. The liquid level is determined from the air pressure captured within a hollow conduit which increases as the liquid level increases. This device, however, is not suited for measuring the depth of a flowing liquid.

To obtain an accurate measure of liquid level using an air/liquid filled tube-type pressure level sensor, hysteresis effects caused by drag forces between the inner wall of the tube and the flowing fluid therein must be minimized. Previously, this was accomplished by filling the tube with silicone oil which exhibited low resistance to flow and, therefore, low hysteresis effects. Unfortunately, water often leached the oil, thereby causing air to become entrained in the oil. This produced high surface tension between the oil and tube and resulted in high hysteresis inaccuracy.

The U.S. patent to Lawrence B. Marsh U.S. Pat. No. 4,549,434, which was assigned to the same assignee as the present invention, discloses a pressure level sensor for mounting a pressure transducer in a conduit containing a flowing liquid characterized by a sensor body having an elongated wedge-shaped configuration which minimizes flow velocity effects on the pressure transducer. This patent relates to the wedge-shaped configuration of the sensor body and the position of the pressure port, and is hereby incorporated by reference.

The present invention was developed to overcome these and other drawbacks of the prior devices by providing an improved pressure level sensor which can provide highly accurate liquid level measurements over a wide range of flow velocities. The sensor includes an initially air-filled tube having at least one generally vertical portion and at least one generally horizontal portion, one end of the tube being exposed to the flowing liquid and the other end communicating with a pressure transducer.

SUMMARY OF THE INVENTION

Accordingly, it is a primary object of the present invention to provide a liquid level sensor for accurately measuring the depth of liquid flowing in a conduit such as a pipe or open channel. The lower portion of the sensor includes a pressure port exposed to the flowing liquid, an initially air-filled passage having at least one generally vertical portion connected at its lower end with the pressure port, and at least one generally horizontal portion, connected at its free end with a pressure transducer contained in the sensor body. When the sensor is mounted in a conduit containing a flowing liquid, the liquid depth and corresponding hydraulic pressure force liquid into the passage via the pressure port, thereby compressing the air within the passage. This pressure is communicated to the pressure transducer and is used to determine the liquid depth at which the sensor body is arranged.

It is a further object of the present invention to provide a liquid level sensor having an initially air-filled pressure communicating tube formed of a high surface tension or hydrophobic material and having a cross-sectional area which prevents liquid in the tube from separating from the unitary liquid volume and migrating to the pressure transducer.

It is another object of the invention to provide a liquid level sensor having a pressure port contained within a transverse channel which prevents debris associated with the flowing liquid from plugging or fouling the pressure port and thereby interfering with the liquid level measurement.

It is a yet further object of the invention to provide a liquid level sensor in which both the location of the transverse channel relative to the nose of the sensor and the shape of the transverse channel act to minimize velocity effects on the liquid level measurement.

BRIEF DESCRIPTION OF THE DRAWINGS

Other objects and advantages of the invention will become apparent from a study of the following specification when viewed in light of the accompanying drawings, in which.

DETAILED DESCRIPTION

Figure 1:
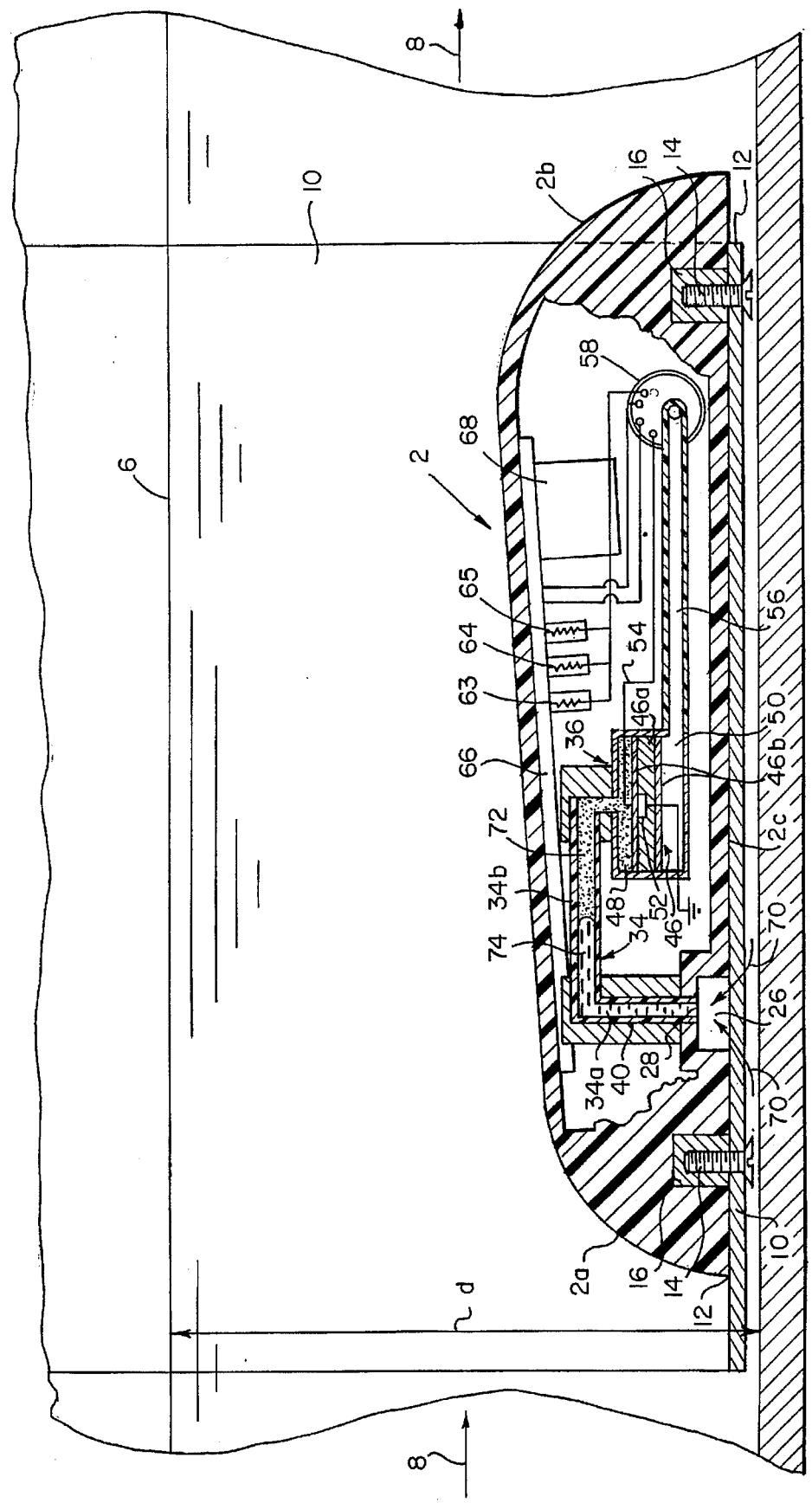
FIG. 1 is a side sectional view of the liquid level sensor according to the invention.
Figure 2:
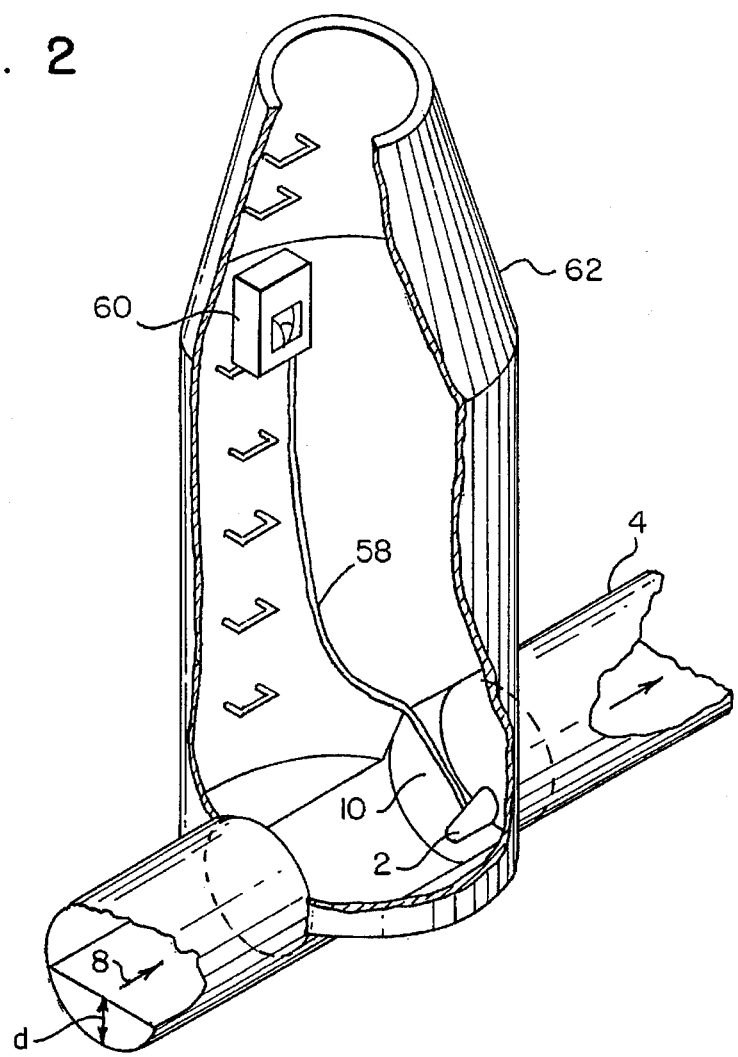
FIG. 2 is a perspective view of the liquid level sensor mounted in a storm or sewer conduit.

Referring first to FIGS. 1 and 2, there is shown a sensor 2 mounted in a conduit 4 such as a municipal waste water pipe containing a flowing liquid 6. The direction of liquid flow is indicated by the arrows 8.

The sensor is installed by first mounting it on a mounting band 10 which extends upstream beyond the nose 12 of the sensor, thereby to reduce turbulence and prevent debris from accumulating on the sensor body. Mounting of the sensor on the band is accomplished using threaded fasteners 14 which pass through openings contained in the mounting band and which are received by fittings 16 molded in the sensor body. The mounting band is then installed in the conduit so that the sensor remains stationary in the flowing liquid use being made of a mounting band which expands radially outwardly so as to make frictional contact with the interior wall of the conduit, thereby holding it firmly in place. To measure the maximum level or depth d of the flowing liquid, the pressure sensor is mounted on the bottom of the conduit.

The sensor body has an elongated compound wedge-shaped configuration wherein the width of the convex front wall portion 2a is less than that of the rear wall portion 2b which in turn is less than the length L of the sensor body. The sensor body 2 is a solid member molded from a suitable synthetic plastic material, such as polyethylene or polypropylene. Alternatively, the sensor body could be formed of any light weight, durable, inexpensive material which is resistant to corrosion. Alternatively, the sensor body could comprise a hollow shell having an outer surface of a configuration corresponding to the elongated compound wedge-shaped configuration shown in FIG. 1.

The bottom wall surface 2c of the sensor body contains a transverse channel 26 arranged generally normal to the longitudinal axis of the sensor body, and thus to the flow direction 8. Preferably, the rear corner edges 29 (FIG. 3) formed in the sensor body by the transverse channel are chamfered or rounded to enhance flow near the channel.

Figure 3:
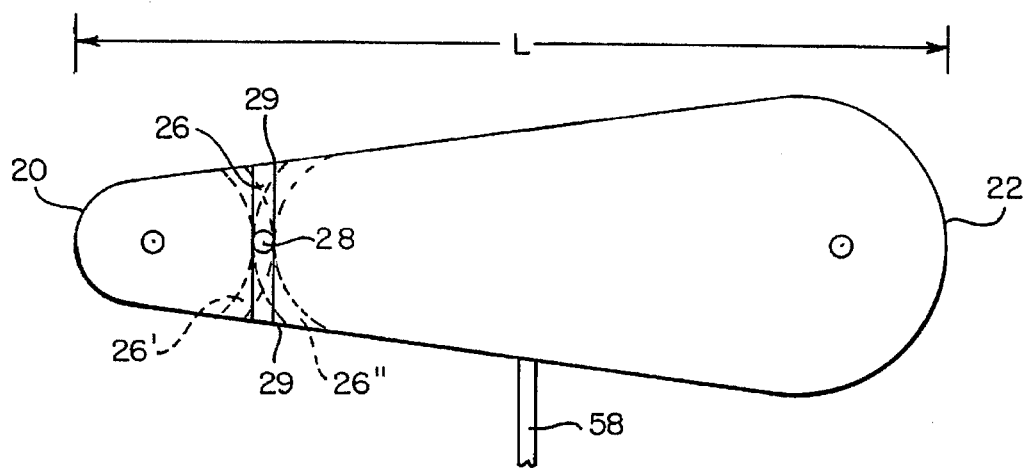
FIG. 3 is a bottom view of the sensor illustrating the location of the pressure port and cross channel.

As shown in FIG. 3, the transverse channel can be linear, or alternatively, it may have a concave forwardly directed configuration 26' or a convex configuration 26", as shown in phantom in FIG. 3. A pressure port 28 is contained within the transverse channel. Connected with the pressure port is a pressure transmitting passage 34 affording communication between the pressure port 28 and the housing of pressure transducer means 36. The pressure transmitting passage includes a vertical portion 34a extending vertically upwardly from the pressure port, and a horizontal portion 34b. The vertical portion is lined with a synthetic plastic material 40 which exhibits low resistance to liquid flow, such as that sold under the trademark Teflon. Alternatively, the vertical portion can be formed of a material which facilitates fabrication such as polyurethane which is treated with a surfactant (such as dish washing detergent) which reduces resistance to liquid flow.

The horizontal portion 34b of the pressure transmitting passage 34, which is also formed of a synthetic plastic material such as Teflon, communicates with the upper extremity of the vertical portion. To minimize measurement error due to hysteresis effects, the cross-sectional area of the pressure transmitting passage 34 is maximized based on the surface tension effects between the liquid and tube, as well as the surface tension properties of the passage. In the case where the liquid is water, the passage is formed of Teflon and has a circular cross-section with a maximum diameter of approximately 0.3 centimeters. This minimizes hysteresis error while ensuring that the water in the passage does not form drops which separate from the continuous liquid volume that could flow to the pressure transducer, thereby causing error in the liquid level measurements.

The cross sectional dimension of the vertical and horizontal portions of the passage can be different, and the cross sectional dimension of each of these portions can vary along their length.

A suitable pressure transducer such as the NOVA Sensor model NPH-8-030GR is connected with the horizontal portion of the pressure transmitting passage. The pressure transducer includes a strain gage 52 mounted within a diaphragm 46 having a center silicone layer 46a which is sealed by an outer layer 46b of silicon dioxide. The diaphragm divides the pressure transducer housing into an upper chamber 48 which is exposed to the liquid level pressure, and a lower chamber 50 which is exposed to ambient or atmospheric pressure. The strain gage 52 mounted in the diaphragm outputs an electrical signal via lead wire 54 which corresponds to the difference between the liquid level pressure exerted on the top surface of the diaphragm and atmospheric pressure exerted on the lower surface.

Atmospheric pressure is supplied to the lower chamber 50 of the pressure transducer via tubular passage 56 which is contained within cable 58. The cable, as shown in FIG. 2, is connected with a measuring instrument or meter 60 typically located in a manhole vault 62. The instrument contains conventional drive, sensing, logging and communications electronics and may also contain a portion of the front end electronics contained in the sensor body.

A plurality of temperature compensation resistors 63, 64, and 65 are mounted on a printed circuit board 66 to compensate for changes in pressure attributable to changes in temperature.

An electromagnetic type flow velocity sensor 68 for measuring the rate of flow in the conduit is also mounted on the printed circuit board. Thus, if the cross-sectional configuration of the conduit is known, the level measurement can be used to calculate the cross-sectional flow area through the conduit. The flow velocity can then be used to calculate the volumetric flow rate through the conduit using the continuity equation Q=VA where Q is the volumetric flow rate, V is the flow velocity and A is the cross-sectional flow area.

Operation

Assume that the sensor body 2 is mounted by the band 10 generally horizontally adjacent the bottom of the conduit 4, facing and generally parallel with the direction of liquid flow 8. The hydraulic head or pressure corresponding to the depth of liquid flowing through the conduit forces liquid indicated by the arrows 70 into the pressure port 28. The liquid first flows upwardly into the vertical portion 34a of the pressure transmitting passage 34. As the liquid flows toward the pressure transducer, the air 72 captured in the tube is compressed. When an equilibrium pressure between the liquid and the compressed air is reached, the head pressure corresponding to the depth of water flowing in the conduit is transmitted to the pressure transducer via the liquid 74 and compressed air 72 in the pressure transmitting passage 34. Owing to the surface tension and cross-sectional configuration of the pressure transmitting passage, liquid entering the horizontal portion of the passage is prevented from separating from the continuous volume of liquid in the form of droplets which could flow to the pressure transducer and cause erroneous pressure level measurements.

The normal operating pressure of the sensor is 5 psi. At this pressure, water flowing in the pressure transmitting passage 34 remains within the vertical portion 34a. The maximum operating pressure of the sensor is 15 psi. At this pressure, water will enter the horizontal portion 34b but will not flow beyond the half way point of the horizontal portion owing to the hydrophobic nature of the material and the air compressed within this portion.

The atmospheric air passage 56 provides air at atmospheric pressure to the opposite side of the pressure transducer which senses the pressure difference between the two sides corresponding to the level of liquid flowing in the conduit.

The electrical signal of the pressure transducer is provided to instrument 60 via lead wire 54 through cable 58 along with the signals from the temperature compensation resistors 63, 64, and 65 and the flow velocity sensor 68. These signals are processed to determine the liquid level depth, flow rate velocity, and volumetric flow rate of the liquid flowing in the conduit.

While in accordance with the provisions of the Patent Statutes the preferred forms and embodiments of the invention have been illustrated and described, it will be apparent to those of ordinary skill in the art that various changes and modifications may be made without deviating from the inventive concept set forth above.

What is claimed is:

1. Apparatus for measuring the level of liquid flowing in a generally horizontal conduit, comprising:
   (a) a sensor body having a longitudinal axis, said sensor body being adapted for arrangement in the conduit below the level of the liquid and generally parallel with the direction of flow thereof, a lower surface portion of said sensor body containing a pressure inlet port;
   (b) pressure transducer means contained within said sensor body; and
   (c) means defining first passage means affording communication between said pressure inlet port and said pressure transducer means, said first passage means including a first vertical portion extending upwardly relative to said pressure inlet port, said first vertical portion having an upper end, and a horizontal portion connected with said first vertical portion upper end, said first passage means being such that when a quantity of air is trapped within at least said vertical passage portion, liquid entering said vertical passage portion via said pressure port produces a degree of compression of the air that is a function of the instantaneous depth of the pressure port within the liquid.

2. Apparatus as defined in claim 1, wherein the cross-sectional area and the surface energy of the wall surface of said first passage means are such as to ensure that liquid within said passage remains a unitary mass.

3. Apparatus as defined in claim 2, wherein the liquid is water, and further wherein said first passage means includes a portion having a circular cross-sectional configuration the diameter of which is no greater than about 0.4 centimeters.

4. Apparatus as defined in claim 1, and further comprising atmospheric air compensating means including means defining second passage means contained in said sensor body for supplying atmospheric air to said pressure transducer means.

5. Apparatus as defined in claim 1, wherein said first passage means is formed of a hydrophobic material.

6. Apparatus as defined in claim 1, wherein said first vertical portion of said first passage means is treated with a surfactant to cause the wall surface of said first vertical portion to have a low coefficient of friction.

7. Apparatus as defined in claim 6, wherein said horizontal portion of said first passage means is formed of a hydrophobic material.

8. Apparatus as defined in claim 1, and further including means for maintaining said pressure port free of debris.

9. Apparatus as defined in claim 8, wherein said debris-free maintaining means comprises a transverse channel contained in the lower portion of said sensor body, said transverse channel being in communication with said pressure port and extending generally normal to said sensor body longitudinal axis.

10. Apparatus as defined in claim 9, wherein said pressure port has a cross-sectional area of about 0.079 square centimeters.

11. Apparatus as defined in claim 10, wherein said sensor body has in the longitudinal direction a generally rearwardly divergent wedge-shaped configuration, whereby measurement error due to velocity effects caused by liquid flowing over said sensor body is minimized.

12. Apparatus as defined in claim 11, wherein said transverse channel is concave relative to the forward end of said sensor body longitudinal axis.

13. Apparatus as defined in claim 11, wherein said transverse channel is convex relative to the forward end of said sensor body longitudinal axis.

14. Apparatus as defined in claim 9, wherein said transverse channel includes rounded rear end edges.

15. Apparatus as defined in claim 11, wherein said transverse channel is contained in the front portion of said sensor body.

16. Apparatus as defined in claim 9, wherein said sensor body includes a bottom wall containing said pressure inlet port.

17. Apparatus as defined in claim 9, and further including:
   (d) temperature compensating means for correcting changes in liquid level measurements caused by temperature changes; and
   (e) velocity sensing means for measuring the velocity of the liquid flow, the volumetric flow rate through the conduit of known dimensions being a function of the sensed level and sensed velocity.

* * * * *